J. C. J. DE LESTANG-PARADE.
CONTROLLING AND REGULATING DEVICE FOR GASEOUS FLUIDS.
APPLICATION FILED NOV. 15, 1917.

1,434,102.   Patented Oct. 31, 1922.

Inventor:
Jacques Charles Joseph de Lestang-Parade
per H. W. Plucker
Attorney.

Patented Oct. 31, 1922.

1,434,102

UNITED STATES PATENT OFFICE.

JACQUES CHARLES JOSEPH DE LESTANG-PARADE, OF PARIS, FRANCE.

CONTROLLING AND REGULATING DEVICE FOR GASEOUS FLUIDS.

Application filed November 15, 1917. Serial No. 202,259.

*To all whom it may concern:*

Be it known that I, JACQUES CHARLES JOSEPH DE LESTANG-PARADE, of 94 Rue Amelot, Paris, France, manufacturer, have invented Improvements in Controlling and Regulating Devices for Gaseous Fluids, of which the following is a full, clear, and exact description.

The present invention relates to improvements in controlling and regulating devices for gaseous fluids permitting of variations of output or discharge according to requirements and constructed in such a way that the selected discharge always remains constant.

A controlling and regulating device according to this invention comprises a diaphragm which is located in a chamber in communication with the gas reservoir, and to which is connected a lever, the displacements of which, occasioned by the expansion or contraction of the diaphragm, covers or uncovers the admission inlet of the gas supply.

The position of this lever, and consequently the flow of the gas, may be regulated at will by means of a special device.

Above the diaphragm is arranged a fluid-tight chamber enclosing air having a pressure corresponding to that of the place where the adjustment of the apparatus was effected.

This chamber prevents the decrease in atmospheric pressure from acting directly on the diaphragm in the event of the expander being transported to a high altitude, which would have the effect of opposing the normal working of the apparatus by causing an insufficient flow of gas.

The present apparatus also comprises, at its upper part, a pressure gauge connected to the gas reservoir by a branch of the same pipe or connection structure that leads the gas to the diaphragm or gas expanding chamber, and enables the volume of gas remaining in the reservoir to be ascertained at all times.

By way of example the invention is illustrated in the accompanying drawing, in which:—

Figure 1:
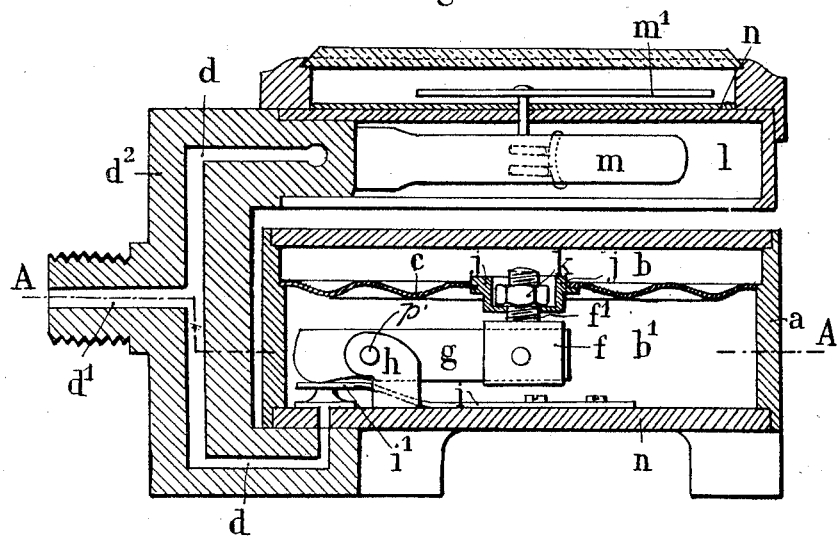
Figure 1 is a sectional elevation of the device.
Figure 2:
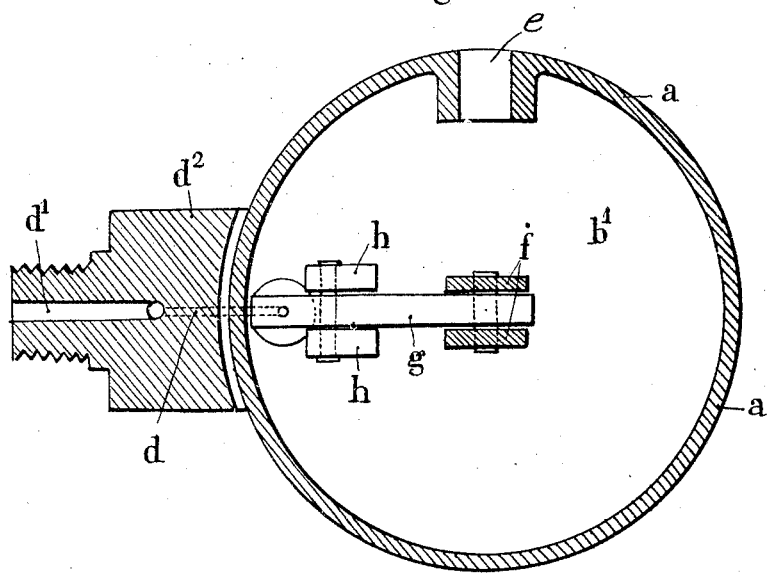
Figure 2 is a sectional plan thereof, taken along the line A—A of Figure 1.

As may be seen in the drawing, the present device comprises a circular box $a$ divided into two compartments $b$ and $b'$ by a diaphragm $c$. The box, it will be seen, has a base structure wherein is a fluid inlet, as well as a co-operating wall part in which the diaphragm $c$, is mounted, and a fluid-tight cover.

The upper compartment $b$ forms a fluid-tight chamber enclosing air at the atmospheric pressure of the place where the apparatus was adjusted, for a purpose which will be indicated further on.

The lower compartment $b'$, in which the expansion of the gas takes place, communicates, on the one hand, by means of passages $d$, $d'$ traversing the connection structure $d^2$, with the gas reservoir, and on the other hand, by means of a conduit $e$, with the apparatus or article that utilizes the expanded gas.

This expansion and control and regulation of the flow of the gas is effected in the following manner:—

At the centre of the diaphragm is mounted a sleeve $f$, in which is pivoted the extremity of a lever $g$. This lever is again pivoted at a second point $p'$ to a support $h$ fixed into the bottom of the box $a$.

The free end of the lever $g$ is in contact with a spring blade $i$, secured to the bottom of the box $a$ and carrying a washer $i'$ capable of being applied to and of closing the orifice of the gas inlet passage $d$, this orifice being placed at a level higher than that of the bottom of the compartment $b'$, as shown in Figure 1.

The improved device arranged in this way operates in the following manner:—

When, by means of a stop-cock or other suitable member arranged on the conduit $e$, by which the gas expanding chamber $b'$ communicates with the apparatus or article that utilizes the expanded gas, the flow of this gas is interrupted, the orifice of the passage $d$ is closed by the washer $i'$ of the spring $i$, which is applied to the said orifice by the pressure exerted on this spring by the lever $g$.

When the cock or member is opened for the purpose of utilizing the expanded gas, the pressure inside the expanding chamber $b'$ falls, which has the result of giving back to the diaphragm its resilience.

The gas under pressure arriving through the canal $d$ can then raise the spring $i$ and enter the compartment $b'$. This entrance of gas continues until the moment when, in consequence of the pressure exerted by the gas on the diaphragm, the latter rises and causes the lever $g$ to turn, which applies the washer $i''$ of the spring $i$ to the orifice of the channel $d$, and vice versa.

It will be understood from the preceding description that, according to the initial position occupied by the lever $g$, the quantity of gas admitted into the expanding chamber $b'$ varies according to the angular displacements of this lever which regulates the admission of gas.

In order to permit of variations of discharge according to requirements, the present apparatus comprises a special device for regulating the lever $g$.

This device is constituted in the following manner:—

A sleeve $f$ in which the extremity of the lever $g$ is pivoted carries a screw-threaded rod $f'$ passing through the bottom of a cup $j$ fixed to the centre of the diaphragm $c$.

This rod receives a nut $k$ located in the said cup and resting on the bottom of the latter, as shown in Figure 1.

By screwing up or unscrewing the nut $k$ to a suitable extent, the initial position of the lever $g$, and consequently the output or discharge of the device or apparatus, will be varied.

The extremity of the screw-threaded rod $f'$ and the nut $k$ may be protected by a cap screwed into the cup.

Figure 3:
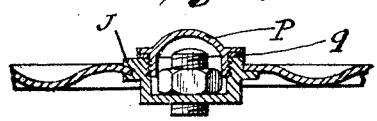
Fig. 3 is a fragmentary sectional view similar to Fig. 1 illustrating a structural detail.

This construction is shown on a somewhat larger scale in Fig. 3, where the externally threaded and shouldered cap $p$ is screwed into the cup $j$, a gasket 9 being interposed between the flange resulting from the shouldering of the cap and the upper surface of the cup $j$ to insure perfect air tightness.

As has been said above, a fluidtight chamber enclosing air at the atmospheric pressure of the place where the apparatus was adjusted is arranged above the diaphragm $c$.

In the event of the apparatus being transported to a higher altitude, the air contained in this chamber, (which in the example illustrated consists of the upper compartment $b$) prevents the lowering of the atmospheric pressure from acting directly on the diaphragm $c$, which would have the effect of causing a displacement of this diaphragm such that the lever $g$ would keep the gas-inlet orifice almost closed and would consequently prevent the apparatus from working normally.

In the present apparatus this disadvantage cannot arise and it ensures under all circumstances a constant flow from the expanding chamber and enables the latter to be utilised in aerial ascents, for expanding compressed oxygen for instance.

The present apparatus is completed by a pressure gauge with upward exposed dial in a chamber $l$, immediately above the box cover. This gauge comprises a Bourdon tube $m$, in direct and constant communication, by the branch $d^2$, of the inlet passage $d'$, with the reservoir of compressed gas, and controlling a needle $m'$ which is displaceable in front of the graduated dial $n$. The object of this gauge is to indicate at all times the volume and the pressure of the gas remaining in the reservoir.

The above arrangements are only given by way of example, and the forms, dimensions and devices of detail may be varied according to circumstances without modifying the principle of the invention.

Claims:

1. In a device for controlling and regulating the flow of gaseous fluids, the combination of a casing and a diaphragm forming an air-tight compartment and a chamber in communication with a source of fluid under pressure, a lever pivoted in said chamber, and a valve washer elastically mounted over the fluid inlet orifice independently of said lever and adapted to be applied to said orifice, by said lever under the action of said diaphragm.

2. In a device for controlling and regulating the flow of gaseous fluids, the combination of a casing and a diaphragm forming an air-tight compartment and a chamber in communication with a source of fluid under pressure, a spring attached to said casing and carrying a valve washer for covering and uncovering the fluid inlet orifice, and a lever connected to said diaphragm and adapted to act upon said valve washer to close the fluid inlet.

3. In a device for controlling and regulating the flow of gaseous fluids, the combination of a casing and a diaphragm forming an air-tight compartment and a chamber in communication with a source of fluid under pressure, said chamber having an inlet orifice in the wall opposite said diaphragm adjacent the side of the chamber; a lever fulcrumed on said wall and operatively connected to the centre of said diaphragm; and a leaf spring attached to the wall of the casing which has said inlet and carrying a valve washer for covering the inlet orifice interposed between said orifice and the end of said lever.

4. A device for controlling and regulating the flow of gaseous fluids, comprising in combination: a casing communicating with a reservoir containing a gaseous fluid under pressure, a diaphragm dividing said casing in two compartments, a lever pivotally connected to the center of the diaphragm and so arranged that its end controls the covering and uncovering of the gas inlet orifice in the lower compartment, a washer and a spring for obtaining this covering and uncovering of the orifice, a sleeve for the joint of the lever, a screw-threaded rod integral with said sleeve, a cup fixed to the center of the diaphragm and provided with an opening for the passage of the screw-threaded rod of the sleeve, and nuts screwed on this rod for varying the position of the sleeve and consequently that of the lever for obtaining variations in the outflow of the apparatus.

5. A device for controlling and regulating the flow of gaseous fluids comprising a base structure with a fluid inlet therein and means cooperating therewith to form a diaphragm-box, a diaphragm in said box and means whereby said diaphragm controls said fluid inlet, a fluid-tight cover for said diaphragm-box, a connection structure at one side of the diaphragm-box having a passage in communication with the fluid inlet in said base, and a pressure gauge with upwardly exposed dial immediately above the box cover also in communication with the passage in said connection structure.

6. A device for controlling and regulating the flow of gaseous fluids comprising a base structure with a fluid inlet therein and means cooperating therewith to form a fluid tight chamber and for regulating the flow of gas through the said inlet; a connection structure at one side of said chamber having a passage in communication with the fluid inlet in said base; and a pressure gauge with upwardly exposed dial carried by said connection structure immediately above said chamber and communicating therethrough with the passage in said fluid inlet, so as to indicate the pressure of the fluid supply.

7. A device for supplying oxygen at atmospheric pressure in aerial ascents comprising a reducing valve controlling the supply of oxygen, and a diaphragm controlling said valve exposed at one side of the oxygen at reduced pressure coming from said valve and at its other side to an enclosed body of fluid at normal atmospheric pressure.

8. A device for controlling the flow of oxygen to aviators from a source of supply under pressure, comprising means to control the flow of the gas to supply the same in limited quantities, pressure controlling means to control said first controlling means to reduce the pressure of the supplied gas to a point approximating atmospheric pressure, and means to vary the relation of the two said controlling means to vary the limits of quantity supply for the same variable fluctuations of the pressure controlling means.

9. A device for controlling the flow of oxygen to aviators from a source of supply under pressure, comprising a casing, a diaphragm therein defining a closed compartment, air filled at atmospheric pressure, and a valve chamber, the latter having inlet and outlet apertures, a valve controlling the inlet aperture, an operative connection between the diaphragm and valve and means to adjust the connection to vary the volume flow of gas for the same degree of fluctuation of the diaphragm.

The foregoing specification of my "Improvements in controlling and regulating devices for gaseous fluids" signed by me this 22nd day of October, 1917.

JACQUES CHARLES JOSEPH de LESTANG-PARADE.

Witnesses:
 CHAS. P. PRESSLY,
 FRANÇOIS WEBER.